United States Patent
Chen et al.

(10) Patent No.: US 8,413,945 B2
(45) Date of Patent: Apr. 9, 2013

(54) MOUNTING APPARATUS FOR EXPANSION CARD

(75) Inventors: Yun-Lung Chen, Taipei Hsien (TW); Da-Long Sun, Shenzhen (CN); Sheng-He Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 268 days.

(21) Appl. No.: 12/955,925

(22) Filed: Nov. 30, 2010

(65) Prior Publication Data

US 2011/0290972 A1    Dec. 1, 2011

(30) Foreign Application Priority Data

May 28, 2010   (CN) .......................... 2010 1 0185821

(51) Int. Cl.
  *F16M 13/00*   (2006.01)
  *H05K 7/14*    (2006.01)

(52) U.S. Cl.
  USPC ... 248/500; 248/316.8; 248/694; 361/679.03; 361/796; 361/801

(58) Field of Classification Search .................. 248/694, 248/27.1, 500, 510, 316.1, 316.8; 361/679.01, 361/361/679.02, 679.31, 679.32, 679.33, 361/755, 759, 801, 796

See application file for complete search history.

(56) References Cited

U.S. PATENT DOCUMENTS

| | | | | |
|---|---|---|---|---|
| 5,030,108 A | * | 7/1991 | Babow et al. | 439/64 |
| 5,317,483 A | * | 5/1994 | Swindler | 361/801 |
| 6,178,624 B1 | * | 1/2001 | Magette | 29/832 |
| 6,693,802 B2 | * | 2/2004 | Vier et al. | 361/801 |
| 6,937,467 B2 | * | 8/2005 | Hsu | 361/679.41 |

* cited by examiner

*Primary Examiner* — Anita M King
(74) *Attorney, Agent, or Firm* — Altis Law Group, Inc.

(57) ABSTRACT

A mounting apparatus includes a mounting tray configured for securing an expansion card, a first securing member, a second securing member, a first rotating member and a second rotating member. The first securing member is attached to a first edge of the mounting tray, and a first stopper portion is disposed on the first securing member. The second securing member is attached to a second opposite edge of the mounting tray, and a second stopper portion is disposed on the second securing member. The first and second rotating members are rotatably secured to the mounting tray. A first and second hooks respectively extend from the first and second rotating members. The first hook is engaged with the first stopper portion, and the second hook engaged with the second stopper portion.

15 Claims, 7 Drawing Sheets

MOUNTING APPARATUS FOR EXPANSION CARD

BACKGROUND

1. Technical Field

The present disclosure relates to mounting apparatuses, and more particularly to a mounting apparatus for securing expansion cards in an electronic device.

2. Description of Related Art

A computer system usually includes expansion cards, such as sound cards, video cards, graphics cards and so on, for enhancing capabilities of the computer system. Conventionally, an expansion card is short and coupled to a riser card, and only one end of the short expansion card is secured to a rear wall of a computer system enclosure. However, it is unstable having only one secured.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
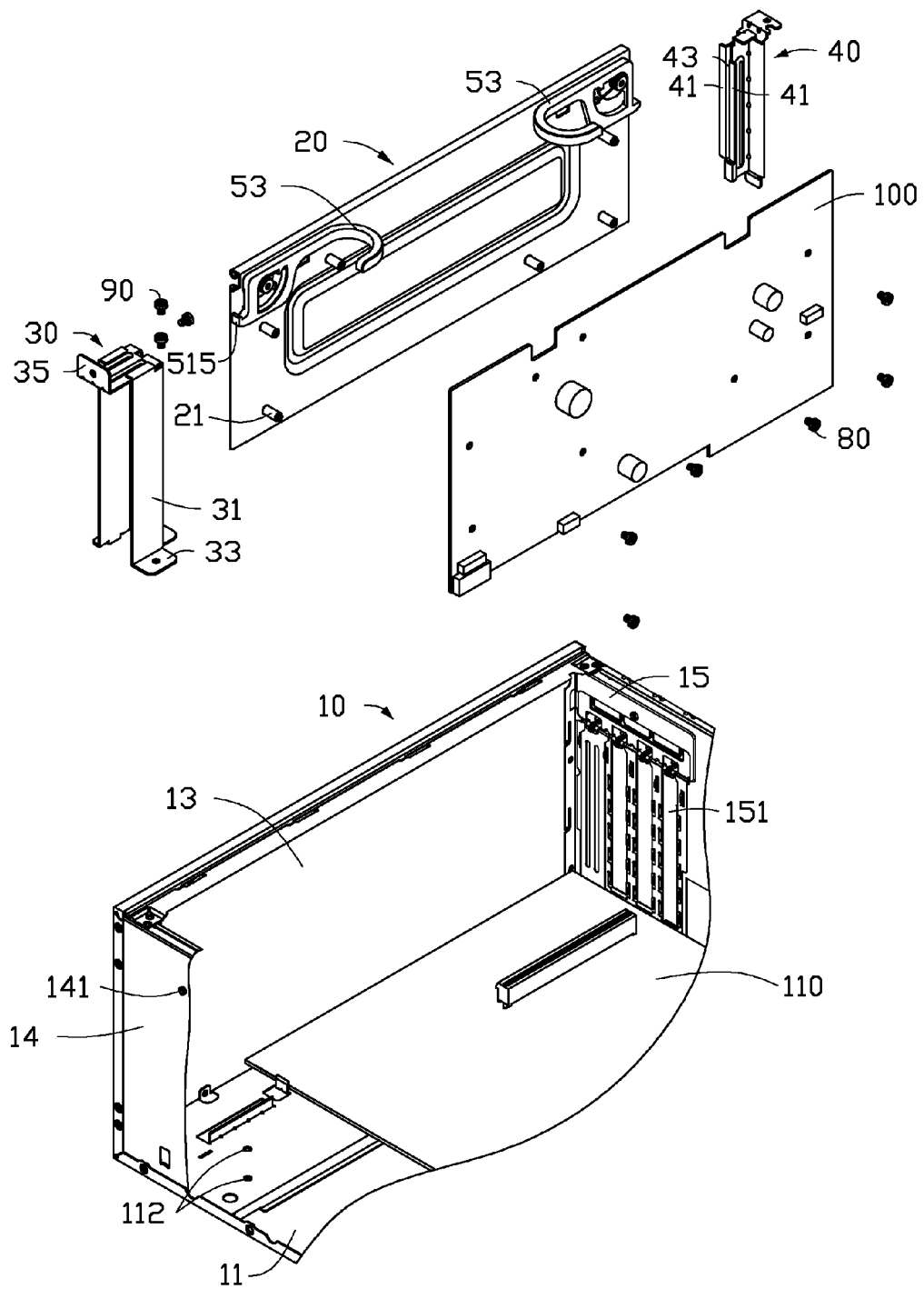
FIG. 1 is an exploded, cutaway, isometric view of a mounting apparatus for an expansion card in accordance with an embodiment.
Figure 2:
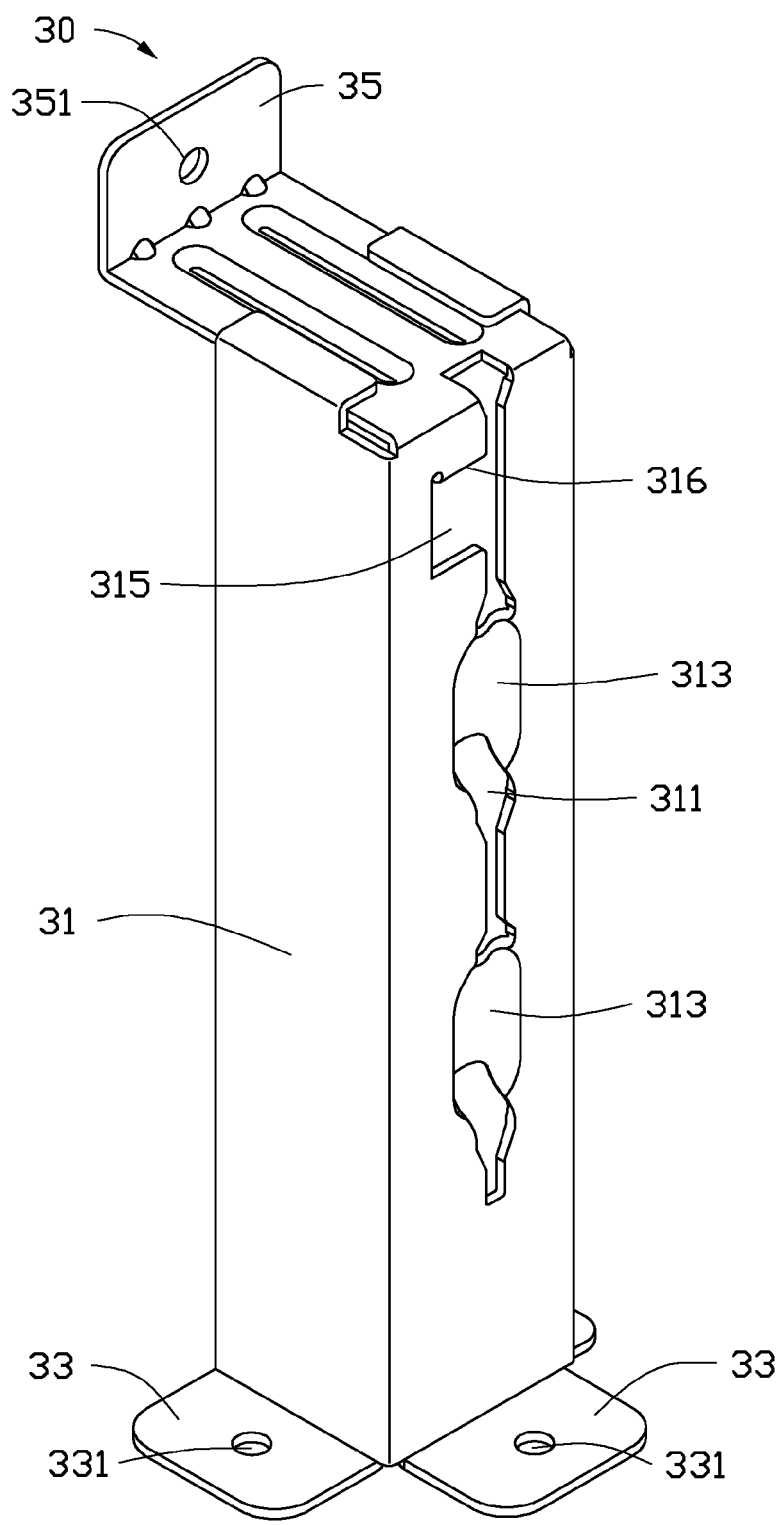
FIG. 2 is an isometric view of a first securing member of the mounting apparatus of FIG. 1.
Figure 3:
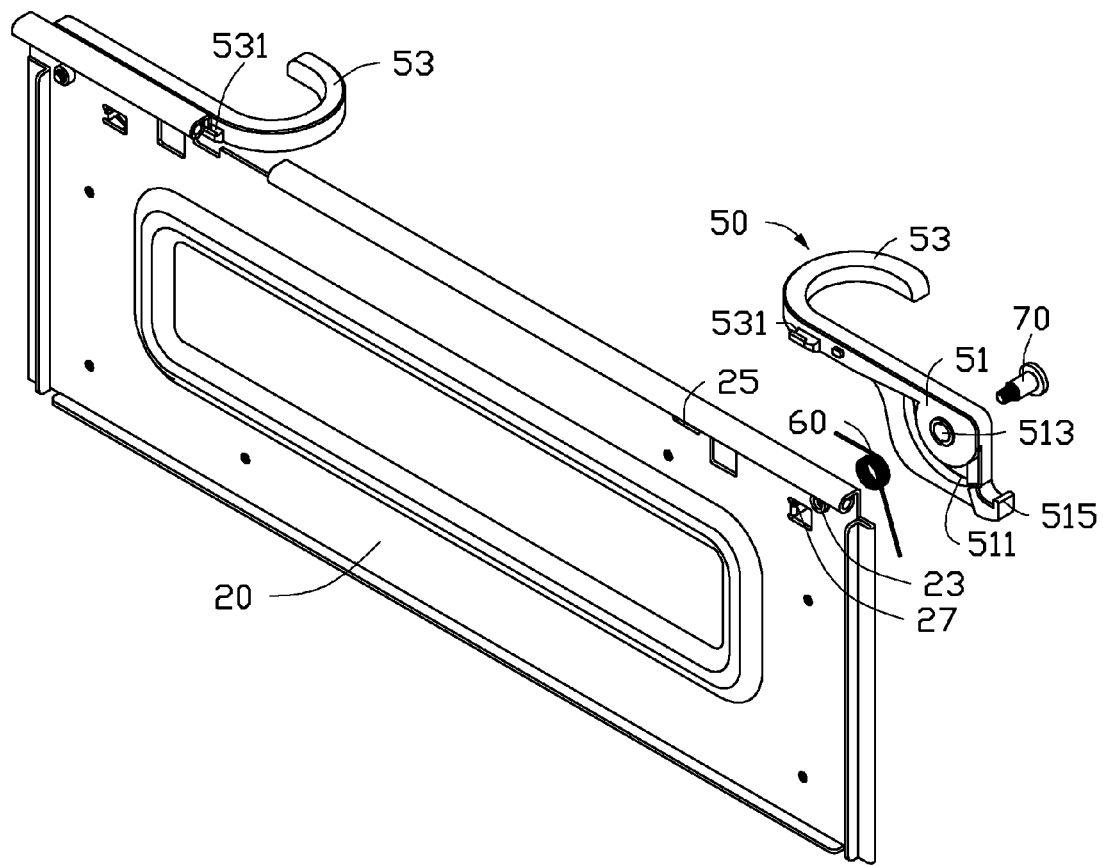
FIG. 3 is a partially exploded, isometric view of a mounting tray of the mounting apparatus of FIG. 1 shown from another aspect.
Figure 4:
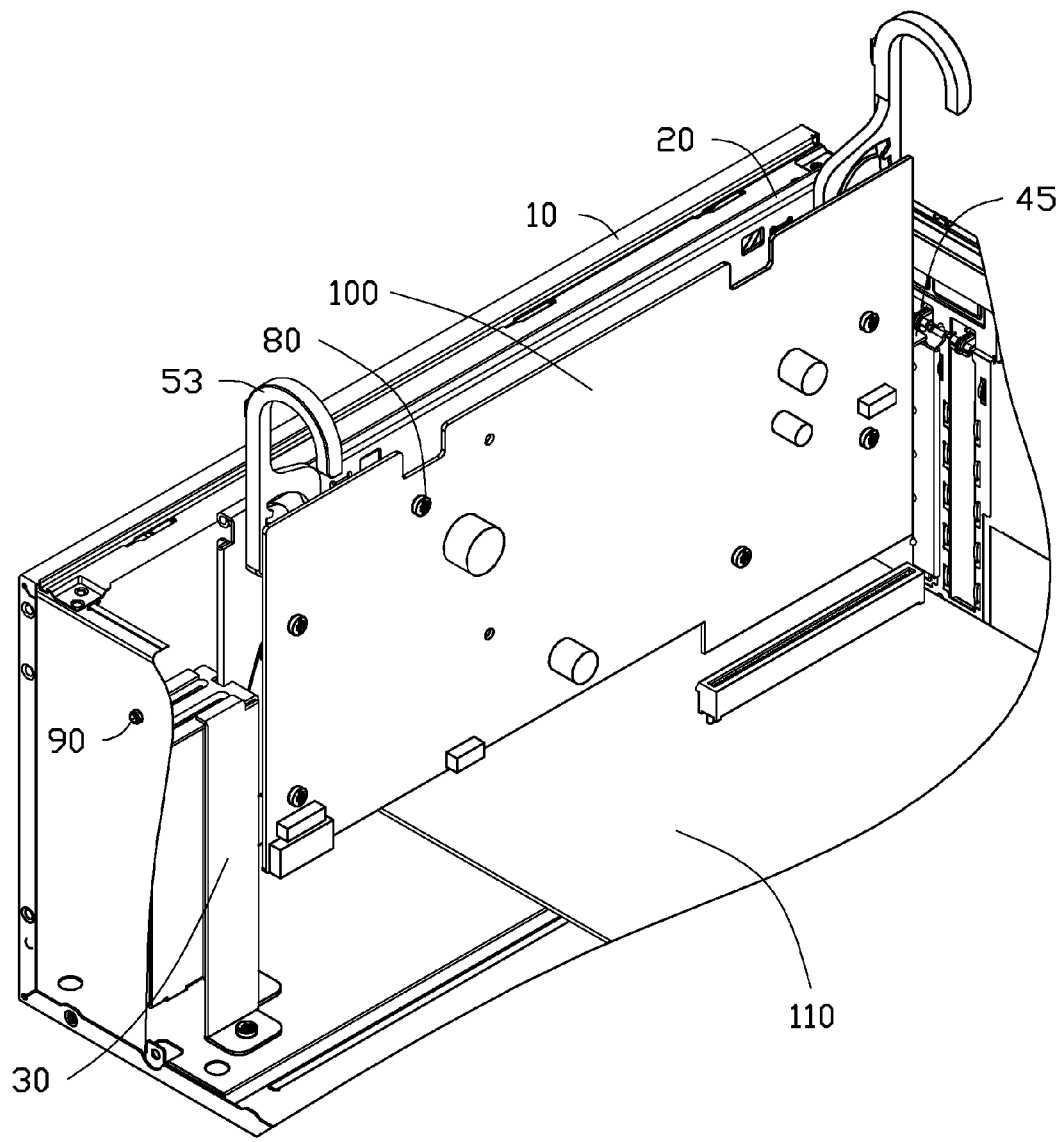
FIG. 4 is an assembled view of FIG. 1, showing two operating portions in a first state.
Figure 5:
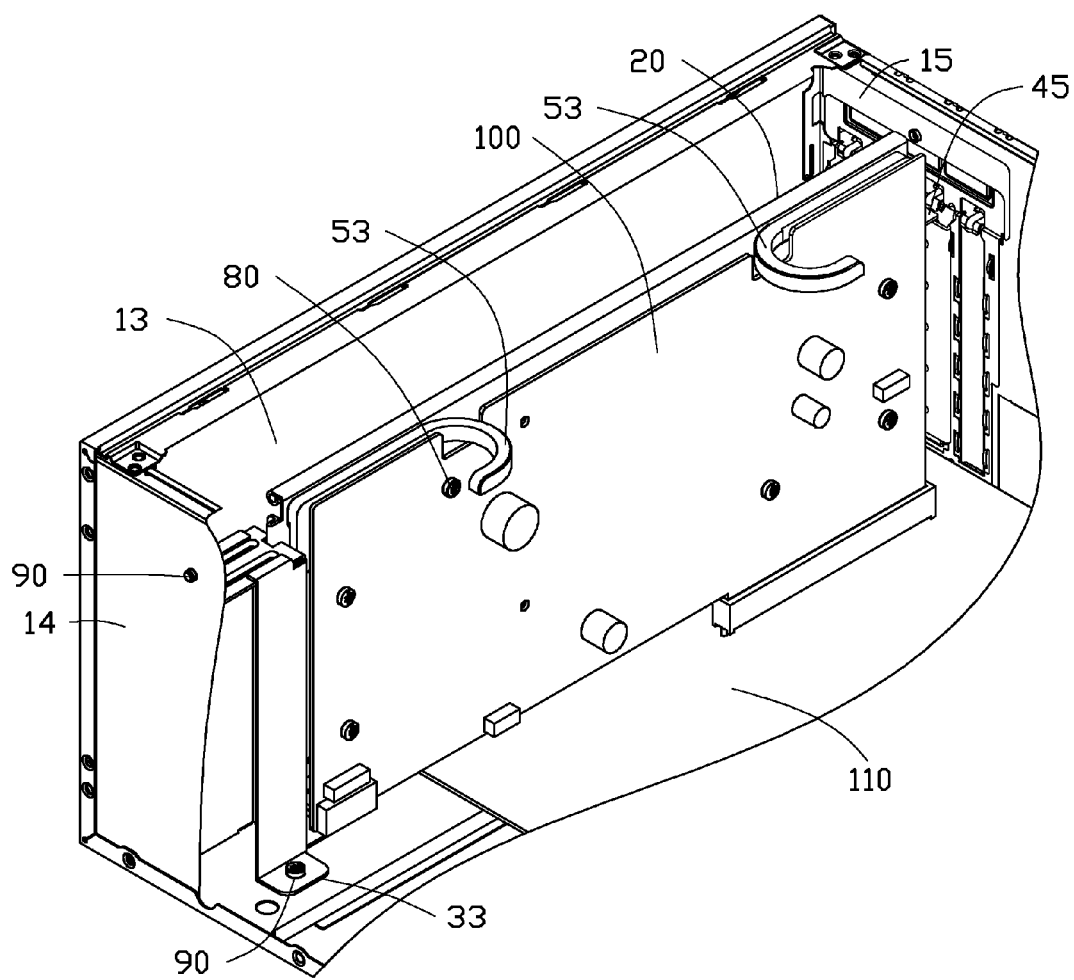
FIG. 5 is similar to FIG. 4, but shows the two operating portions in a second state.
Figure 6:
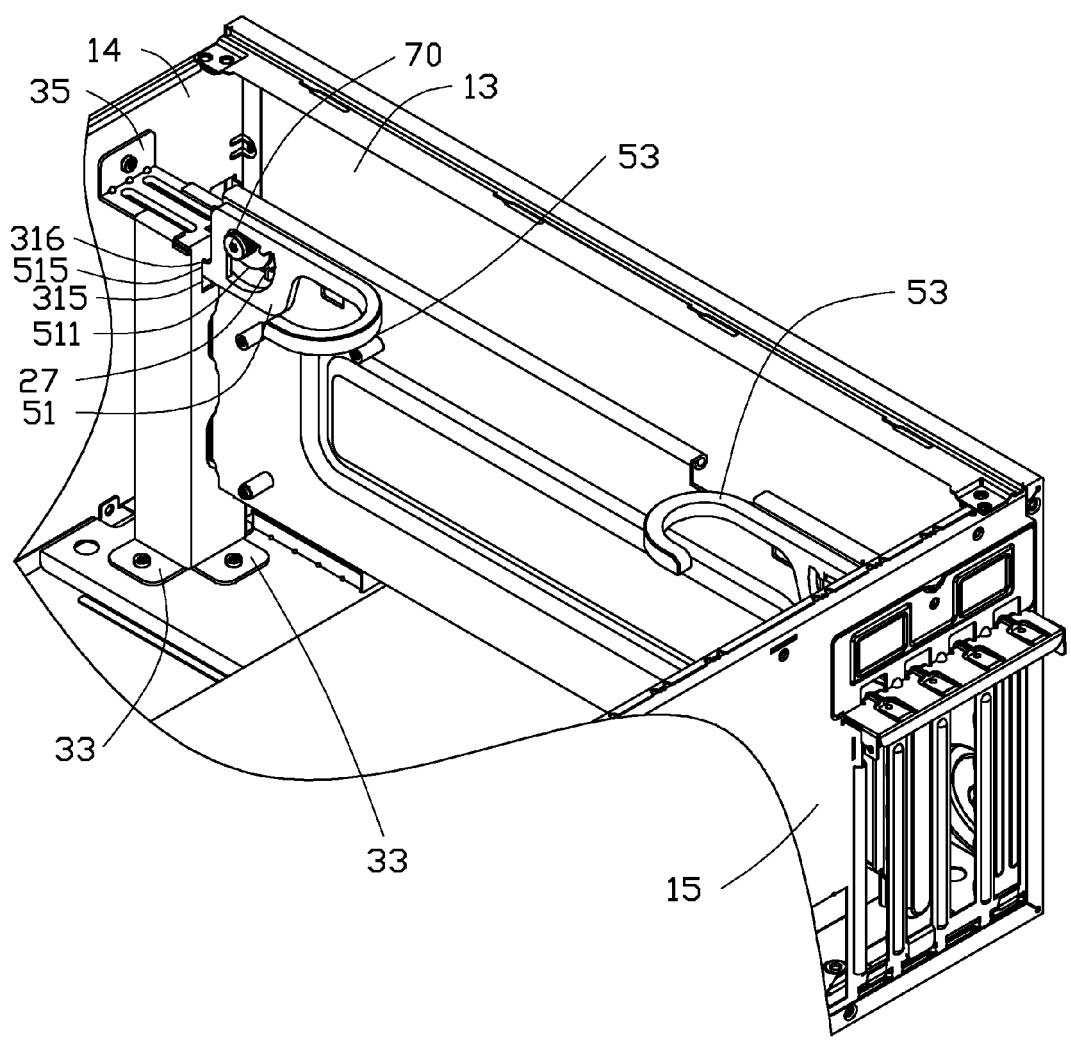
FIG. 6 is an assembled view of FIG. 1, but viewed from a different aspect, and the expansion card is not shown.
Figure 7:
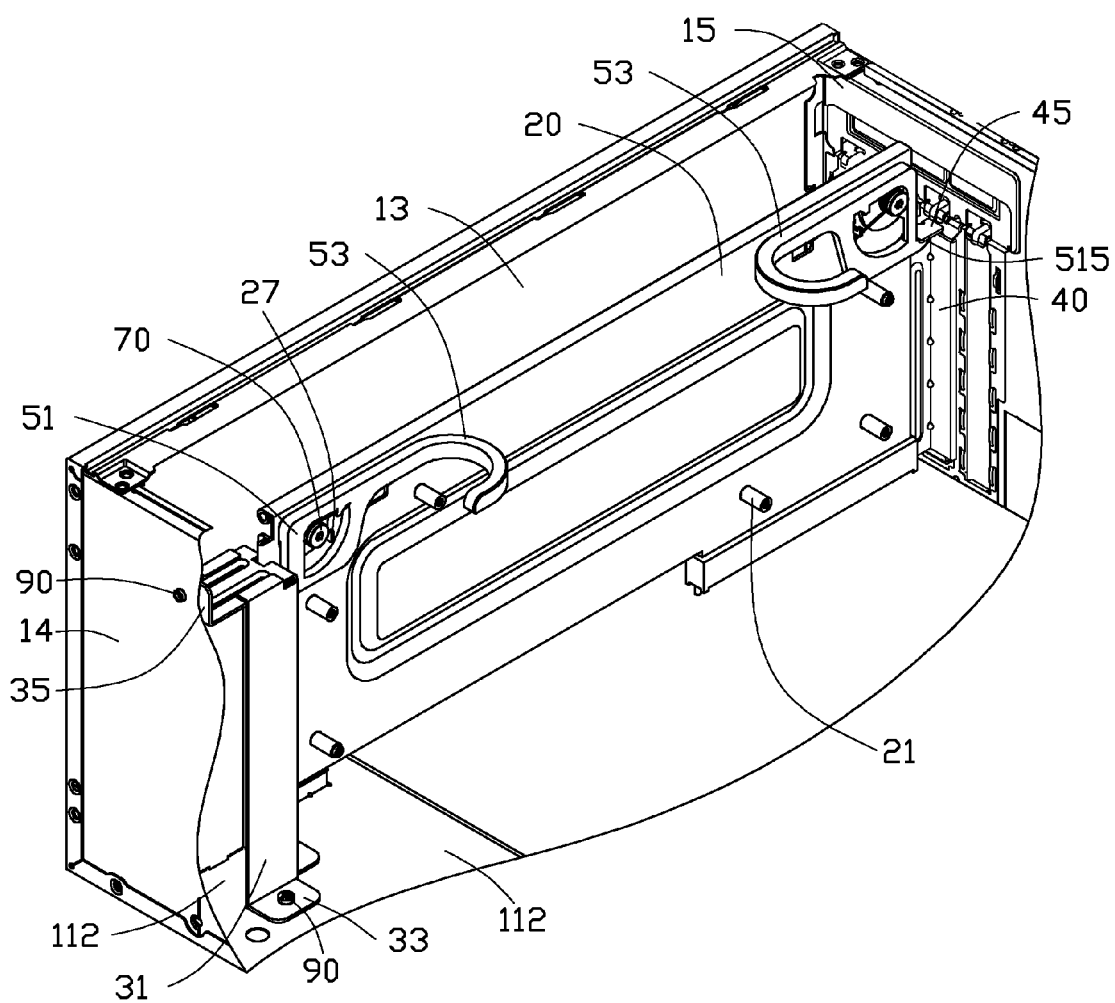
FIG. 7 is similar to FIG. 6, but viewed from a different aspect.

Referring to FIGS. 1 to 3, a mounting apparatus in accordance with an embodiment is configured for securing an expansion card 100 and includes a chassis 10 (only a part is shown), and a mounting tray 20. The expansion cards 100 may be, for example, sound cards, video cards, graphics cards, or other peripheral component interconnection cards.

The chassis 10 includes a bottom plate 11, a side plate 13 connected to a long edge of the bottom plate 11, a front plate 14 connected to a first short edge of the bottom plate 11, and a rear plate 15 connected to a second short edge of the bottom plate 11. Two retaining holes 112 are defined in the bottom plate 11, and a motherboard 110 is attached to the bottom plate 11. In one embodiment, the bottom plate 11 is substantially perpendicular to the side plate 13 and the front plate 14, and the front plate 14 is parallel to the rear plate 15.

A front plate hole 141 is defined in the front plate 14. A first securing member 30 is mounted between the front plate 14 and the bottom plate 11.

Referring to FIG. 2, the first securing member 30 includes a main body 31, two bottom pieces 33 connected to two adjacent bottom edges of the main body 31, and a top piece 35 connected to an upper edge of the main body 31. A first clipping slot 311 is defined in the main body 31, and two blocks 313 are connected to two longer opposite edges of the first clipping slot 311. In one embodiment, the first clipping slot 311 is longitudinally defined in the center of the main body 31. A nick 315 extends from a long edge of the first clipping slot 311, to form a first stopper portion 316 thereon. A fixing hole 331 is defined in each bottom piece 33, corresponding to the two retaining holes 112. A mounting hole 351 is defined in the top piece 35, corresponding to the front plate hole 141.

Referring to FIG. 1, a number of expansion slots 151 is defined in the rear plate 15, adjacent to the side plate 13. A second securing member 40 can be received in an expansion slot 151. Two opposite flanges 41 extend from one side of the second securing member 40, and a second clipping slot 43 is defined between the two opposite flanges 41. A second stopper portion 316 is disposed on an upper edge of the second securing member 40.

Referring to FIG. 3, six posts 21 (shown in FIG. 1), configured to secure the expansion card 100, are disposed on one side of the mounting tray 20. Two through holes 23 are respectively defined in two top corners of the mounting tray 20. Each through hole 23 and a fixing member 70 can secure a rotating member 50 to the tray 20. The rotating member 50 includes a securing portion 51 and an operating portion 53 extended from the securing portion 51. A sliding slot 511 and a pivot hole 513 are defined in the securing portion 51. In one embodiment, the sliding slot 511 is an arc. A hook 515 is located on one side of the securing portion 51, configured for engaging with the first stopper portion 316 or the second stopper portion 316, to prevent the rotating member 50 from rotating. A clipping portion 531 protrudes on a side of the operating portion 53. A clipping hole 25, configured for accommodating the clipping portion 531, is defined in the mounting tray 20. A tab 27 adjacent to the through hole 23 extends from the mounting tray 20 and is configured for sliding in the sliding slot 511.

Referring to FIGS. 4-7, in assembly, the first securing member 30 is placed on the bottom plate 11 and attached to the front plate 14. The front plate hole 141 is aligned with the mounting hole 351, and a first fastening member 90 is inserted into the front plate hole 141 and the mounting hole 351, to secure the top piece 35 to the front plate 14. The fixing hole 331 of the bottom piece 33 is aligned with the retaining hole 112 of the bottom plate 11. A second fastening member 90 is inserted into the fixing hole 331 and the retaining hole 112, to mount the bottom piece 33 to the bottom plate 11. The second securing member 40 is clipped into the expansion slot 151.

Two resilient components 60 are respectively attached on two through holes 23 of the mounting tray 20. Each rotating member 50 is attached to each resilient component 60. The through hole 23 of the mounting tray 20 is aligned with the pivot hole 513 of the rotating member 50, and the fixing member 70 is screwed into the pivot hole 513, the resilient component 60 and the through hole 23. Thus, the rotating member 50 is secured to the mounting tray 20. The expansion card 100 is secured on the mounting tray 20 by a number of screws 80.

The rotating member 50 can be rotated between a first state and a second state. In the first state (shown in FIG. 4), the rotating member 50 is vertically located on the mounting tray 20, the resilient component 60 is released, and the tab 27 is received in sliding slot 511, adjacent a first end of the sliding slot 511. The first end of the sliding slot 511 is near to the hook 515. The clipping portion 531 of the rotating member 50 is disengaged with the clipping hole 25 of the mounting tray 20. In the second state (shown in FIGS. 5-6, the rotating member 50 is horizontally located on the mounting tray 20, and the resilient component 60 is elastically deformed. The tab 27 is received in a second end away from the first end of the sliding slot 511, and the clipping portion 531 of the rotating member 50 is engaged with the clipping hole 25 of the mounting tray 20.

The two rotating members 50 are rotated to the first state, by urging the operating portion 53 of the two rotating member 50. The mounting tray 20 with the rotating member 50 and the expansion card 100 is located between the front plate 14 and the rear plate 15. A first edge of the mounting tray 20 is clipped into the first clipping slot 311 of the first securing member 30, and a second opposite edge of the mounting tray 20 is clipped into the second clipping slot 43. The two rotating member 50 are rotated to the second state, by urging the operating portion 53 of the two rotating member 50. The hook 515 of a first rotating member 50 is engaged with the first stopper portion 316, to prevent the one rotating member 50 from further rotating. The hook 515 of a second rotating member 50 is engaged with the second stopper portion 316, to prevent the other rotating member 50 from further rotating.

In disassembly, the operating portion 53 of the rotating member 50 is rotated in the first state, by urging the operating portion 53 of the rotating member 50. The operating portion 53 is carried in a direction away from the bottom plate 11, and the first and second edges of the mounting tray 20 are respectively disengaged from the first clipping slot 311 and second clipping slot 43. Thus, the mounting tray 20 with the expansion card 100 can be removed from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a mounting tray configured for securing an expansion card;
   a first securing member attached to a first edge of the mounting tray, and a first stopper portion disposed on the first securing member;
   a second securing member attached to a second opposite edge of the mounting tray, and a second stopper portion disposed on the second securing member and
   a first rotating member and a second rotating member rotatably secured to the mounting tray, a first hook extending from the first rotating member, and a second hook extending from the second rotating member;
   wherein the first hook of the first rotating member is engaged with the first stopper portion, and the second hook of the second rotating member is engaged with the second stopper portion; a resilient component is sandwiched between the mounting tray and the first and the second rotating members, the resilient component deforms between a first position, where the first hook is engaged with the first stopper portion, and a second position, where the first hook is disengaged from the first stopper portion.

2. The mounting apparatus of claim 1, wherein a first clipping slot is defined in the first securing member, and the first edge of the mounting tray is received in the first clipping slot.

3. The mounting apparatus of claim 1, wherein a second clipping slot is defined in the second securing member, and the second opposite edge of the mounting tray is accommodated in the second clipping slot.

4. The mounting apparatus of claim 1, wherein a clipping hole is defined in the mounting tray, and a clipping portion engaged with the clipping hole is disposed on the rotating member.

5. The mounting apparatus of claim 2, wherein a nick is defined on the first securing member, communicating to the first clipping slot, and the first stopper portion is connected to an edge of the nick.

6. The mounting apparatus of claim 4, wherein each of the first and the second rotating member comprises an operating portion, and the clipping portion is disposed on the operating portion.

7. The mounting apparatus of claim 6, wherein each of the first and the second rotating member further comprises a securing portion connected to the operating portion, a sliding slot is defined in the securing portion, and a tab, that is capable of sliding in the sliding slot, extends from the mounting tray.

8. The mounting apparatus of claim 7, wherein the first and second hooks extend from the securing portion.

9. A mounting apparatus comprising:
   a chassis having a bottom plate, a front plate connected to the bottom plate, and a rear plate opposite to the front plate;
   a first securing member attached to the front plate;
   a second securing member attached to the rear plate;
   a mounting tray located between the first and second securing members, configured for securing an expansion card;
   a first rotating member and a second rotating member rotatably secured to the mounting tray; and
   a resilient component sandwiched between each of the first and second rotating members and the mounting tray;
   wherein the each of the first and second rotating members is configured to be rotated between a first state and a second state with the resilient component, in the first state, the each of the first and second rotating members is vertically located on the mounting tray and disengaged from the each of the first and second securing members, with the resilient component is released; in the second state, the rotating member is horizontally located on the mounting tray and engaged with the each of the first and second securing members, with the resilient component is elastically deformed.

10. The mounting apparatus of claim 9, wherein a first stopper portion disposed on the first securing member, and a hook engaged with the first stopper portion is disposed on each rotating member.

11. The mounting apparatus of claim 10, wherein a first clipping slot accommodating a first edge of the mounting tray, defined in the first securing member, and a second clipping slot accommodating a second opposite edge of the mounting tray, defined in the second securing member.

12. The mounting apparatus of claim 11, wherein a nick communicating to the first clipping slot is defined on the first securing member, and the first stopper portion is connected to an edge of the nick.

13. The mounting apparatus of claim 9, wherein two clipping holes are defined in the mounting tray, and a clipping portion engaged with the two clipping holes is disposed on each of the first and second rotating members.

14. The mounting apparatus of claim 13, wherein each of the first and second rotating member comprises an operating portion, and the clipping portion is disposed on the operating portion.

15. The mounting apparatus of claim 14, wherein each of the first and second rotating members comprises a securing portion connected to the operating portion, a sliding slot is defined in the securing portion, and a tab, that is capable of sliding in the sliding slot, extends from the mounting tray.

* * * * *